United States Patent [19]

Nudelman et al.

[11] 4,164,425

[45] Aug. 14, 1979

[54] CEMENT AND PROCESS FOR PRODUCING SAME

[76] Inventors: Boris I. Nudelman, Chilanzar, kvartal 8, 27, kv. 48; Alexandr S. Sventsitsky, Severo-Vostok-2, 50, kv. 64; Marsel Y. Bikbau, massiv Junus-Abad, B-2, 21, kv. 58; Isaak M. Bun, Chilanzar, kvartal 8, 6a, kv. 19; Arnold A. Kevvai, massiv Kara-Kamysh 1/3, 51, kv. 42, all of Tashkent, U.S.S.R.

[21] Appl. No.: 806,510

[22] Filed: Jun. 14, 1977

[30] Foreign Application Priority Data

Aug. 20, 1976 [SU] U.S.S.R. .................. 2397380

[51] Int. Cl.$^2$ ............................... C04B 7/02
[52] U.S. Cl. .................... 106/89; 106/100; 106/104
[58] Field of Search ............ 106/89, 100, 104

[56] References Cited

U.S. PATENT DOCUMENTS

| | | | |
|---|---|---|---|
| 3,628,973 | 12/1971 | Greening et al. | 106/100 |
| 3,782,992 | 1/1974 | Uchikawa et al. | 106/89 |
| 3,864,138 | 2/1975 | Uchikawa et al. | 106/89 |
| 3,942,994 | 3/1976 | Murray et al. | 106/104 |
| 3,947,283 | 3/1976 | Uchikawa et al. | 106/104 |
| 4,028,126 | 6/1977 | Mori et al. | 106/104 |

*Primary Examiner*—James Poer
*Attorney, Agent, or Firm*—Robert E. Burns; Emmanuel J. Lobato; Bruce L. Adams

[57] ABSTRACT

Cement is disclosed having the following composition, in percent by weight: 20 to 75% of highly basic calcium chlorosilicate, 10 to 55% of calcium chloro-orthosilicate, 0.5 to 30% of calcium chloroaluminate, 2 to 20% of calcium chloroalumoferrite; cement of the foregoing compositions is produced by calcining at a temperature within the range of from 1,000° to 1,200° C. a raw mixture containing a calcareous component, siliceous component, aluminous component, ferrous component, magnesium-containing component and calcium chloride in particular proportions, and then grinding the resultant cement clinker. This cement features a reduced heat emission in the initial stage of the hydration process and possesses a high activity. No corrosion of steel reinforcement is observed in concretes produced from the present cement. The cement can be used in heavy-duty concrete structures such as hydropower dams, in the production of high-strength concretes and ferroconcrete structures. The present process involves calcination at lowered temperatures and makes it possible to obtain a cement clinker possessing a high porosity and increased grinding ability thus reducing power consumption for its grinding by 2–2.5 times.

5 Claims, No Drawings

CEMENT AND PROCESS FOR PRODUCING SAME

BACKGROUND OF THE INVENTION

The present invention relates to the production of building materials and, more specifically, to cements and processes for producing the same.

Cements are known which contain highly-basic calcium silicate (alite), calcium ortho-silicate (belite), calcium chloroaluminate, calcium alumoferrite. In addition to the above-mentioned components, the cement might contain such additives as sulphates, nitrates, chlorides of alkali or alkali-earth metals.

A process for producing the above-mentioned cements is also known which comprises calcination of a raw mixture consisting of calcareous, silicaceous, aluminous, ferrous components and calcium halide at a temperature within the range of from 1,300° to 1,400° C., followed by grinding of the resulting cement clinker. At the grinding stage the clinker might be added with such agents as sulphates, nitrates, chlorides of alkali or alkali-earth metals.

The prior art cements, especially those with a high aluminate content have highly exothermal characteristics at the initial stage of the hydration process, which causes certain difficulties in laying big concrete monoliths based on such cements and impairs their quality. Furthermore, such prior art cements have an insufficiently high activity which hinders application thereof for the production of high-strength concretes.

The above-described prior art process for producing such cements has the disadvantage of a high calcination temperature, resulting in an increased consumption of fuel. Furthermore, the cement clinker produced at this temperature features a lowered grindability which results in a high power consumption for the grinding thereof.

SUMMARY OF THE INVENTION

It is an object of the present invention to provide a composition of cement which makes it possible to reduce heat emission in the initial stage of the process of cement hydration.

It is another object of the present invention to provide a cement having a high activity.

It is still another object of the present invention to provide a process for producing cement with the above-mentioned properties which makes it possible to perform calcination of a raw mixture at lowered temperatures and to obtain, as a result, a cement clinker featuring a high grinding ability.

These and other objects of the present invention are accomplished by a cement consisting of calcium silicates, calcium chloroaluminate and calcium alumoferrite, wherein as calcium silicates a highly-basic calcium chlorosilicate and calcium chloro-orthosilicate are employed, while as calcium alumoferrite use is made of calcium chloroalumoferrite; the components being contained in the following proportions, percent by weight:
highly-basic calcium silicate: 20 to 75
calcium chloro-orthosilicate: 10 to 55
calcium chloroaluminate: 0.5 to 30
calcium chloroalumoferrite: 2 to 20.

DESCRIPTION OF THE INVENTION

The cement according to the present invention has the following properties:

| | |
|---|---|
| heat emission, J/g | |
| during the first day of hydration | 115 to 140 |
| during the first three days of hydration | 165 to 196 |
| ultimate compression strength for samples with the dimensions of 4 × 4 × 16 cm consisting of 1 part by weight of cement, 3 parts by weight of quartz sand and 0.5 part by weight of water after 28 days of hardening in water at the temperature of 20° ± 2° C., kgf/cm² | 400 to 500 |
| corrosion of steel reinforcement in the concrete samples made from the cement according to the present invention | none. |

Cement with the above-described properties features a low heat emission in the first stage of the process of cement hydration which makes it possible to employ such cement in heavy-duty concrete structures, for example in hydropower dams. Owing to its high activity, this cement might be used for the manufacture of high-strength concretes. Absence of corrosion of steel reinforcement in concretes made from the cement according to the present invention makes it possible to use the above-mentioned cement in the production of ferroconcrete structures.

The cement according to the present invention is produced by a process comprising calcination of a raw mixture consisting calcareous, silicaceous, aluminous, ferrous components and calcium chloride, followed by grinding of the resulting cement clinker; in doing so, in accordance with the present invention use is made of a raw mixture containing, in addition to the above-mentioned components, a magnesium-containing component, the components being contained in the following proportions, percent by weight:
calcareous component (calculated for CaO): 31.1 to 39.6
silacaceous component (calculated for $SiO_2$): 13 to 16
aluminous component (calculated for $Al_2O_3$): 3.1 to 11
ferrous component (calculated for $Fe_2O_3$): 0.9 to 4.5
calcium chloride: 6 to 20
magnesium-containing component (calculated for MgO): 1.4 to 4
losses at calcination: the balance;
the calcination of the raw mixture being conducted at a temperature within the range of from 1,000° to 1,200° C.

The process according to the present invention makes it possible to lower the calcination temperature down to 1,000° to 1,200° C. substantially reducing the fuel consumption. The resulting cement clinker obtained at these temperatures possesses a considerable porosity (45 to 65%) and, therefore, a high grinding ability thus reducing energy consumption for grinding of the cement by 2 to 2.5 times.

The cement according to the present invention is produced in the following manner.

The starting components are subjected to a separate or combined grinding (in the separate grinding the raw mixture is further subjected to homogenization). The grinding can be performed both in the presence of water (wet grinding) and without it (dry grinding). In the case of wet grinding, water is added in an amount of from 25 to 35% by weight of the total amount of the starting components. In the case of wet grinding of the starting components, calcium chloride can be used both in the form of a dry product and in the form of its aqueous solutions of appropriate concentrations. After dry grinding the resulting raw mixture can be granulated with the addition of water in an amount of from 6 to 9% to pellets with a diameter of from 5 to 20 mm.

A cement clinker is produced from the thus-prepared raw mixture in the form of raw flour, granules or slurry (the raw mixture with water) by placing it into a thermal unit, wherein calcination is effected at a temperature within the range of from 1,000° to 1,200° C. To produce cement, the clinker is discharged from the thermal unit and subjected to grinding. To impart the desired properties to the cement, the clinker can be incorporated with special additives during its grinding such as gypsum, an active mineral additive, surface-active compounds.

Calcium chloride, as the starting component of the raw mixture, can be used both in its pure form and in the form of a calcium chloride containing component. This component can be incorporated into the raw mixture either in the stage of grinding of the components or in the stage of calcination in the thermal unit, whereinto calcium chloride is fed separately from the mixture of other raw components; said supply of calcium chloride and the mixture of other components is effected continuously.

For a better understanding of the present invention some specific Examples illustrating production of cement are given hereinbelow. In all the Examples heat emission from the cement in the hydration stage is determined by means of a microcalorimeter. Activity of cement is characterized by ultimate compression strength as determined for samples with the dimensions of 4×4×16 cm consisting of 1 part by weight of cement, 3 parts by weight of quartz sand and 0.5 part by weight of water after 28 days of hardening in water at the temperature of 20°±2° C. The grinding ability of the cement clinker is determined by consumption of power for its grinding to a predetermined fineness. Corrosion of steel reinforcement in concretes produced from the cement according to the present invention is determined by a quantitative method, i.e. by weight losses of reinforcing rods upon storage of the samples in the air atmosphere with a 100% relative humidity at the temperature of 20° C.

EXAMPLE 1

A raw mixture having the following composition is prepared, percent by weight:
marbled limestone (calculated for CaO): 39.6
quartz sand (calculated for $SiO_2$): 15.2
commercial alumina (calculated for $Al_2O_3$): 3.1
pyrite cinders (calculated for $Fe_2O_3$): 3.8
calcium chloride (chemically pure): 6
magnesite (calculated for MgO): 1.4
losses at calcination: 30.9

Said components are subjected to combined dry grinding. The ground product has a residue of not more than 10% by weight on a sieve with a hole diameter of 80 mcm. The thus-prepared raw mixture is then granulated to pellets with a diameter of from 10 to 15 mm.

The granulated raw mixture is fed into a furnace, wherein calcination is performed at the temperature of 1,200° C. till the clinker-formation process is completed. To produce cement, the clinker is discharged from the furnace and subjected to grinding. Specific consumption of power for grinding of the cement clinker to the residue of 12.2% on a sieve with the hole diameter of 80 mcm is 10.5 kW/hr/ton; that for the residue of 4% is 36 kW.hr/ton.

The thus-produced cement has the following composition, percent by weight:
highly-basic calcium chlorosilicate: 75
calcium chloro-orthosilicate: 10
calcium chloroaluminate: 0.5
calcium chloroalumoferrite: 14.5

The cement has the following properties:
heat emission, J/g:
during the first day of hydration: 132
during the first three days of hydration: 194
ultimate compression strength, $kgf/cm^2$: 495
corrosion of steel reinforcement of concrete samples made of this cement: none.

EXAMPLE 2

A raw mixture is prepared consisting of the following components, percent by weight:
limestone (calculated for CaO): 31.1
diatomite (calculated for $SiO_2$): 16
china clay (calculated for $Al_2O_3$): 4.7
hematite (calculated for $Fe_2O_3$): 4.5
calcium chloride (commercial), calculated for $CaCl_2$: 20
magnesite (calculated for MgO): 2.5
losses at calcination: 21.2

Grinding of these components, granulation of the raw mixture and grinding of the resulting cement clinker are effected in a manner similar to that described in the foregoing Example 1. Calcination of the raw mixture is conducted at the temperature of 1,000° C. Specific power consumption for grinding of the cement clinker to a residue of 11.5% on a sieve with a hole diameter of 80 mcm is 12.7 kw.hr/ton.

The final cement has the following composition, percent by weight:
highly-basic calcium chlorosilicate: 20
calcium chloro-orthosilicate: 55
calcium chloroaluminate: 5
calcium chloroalumoferrite: 20

The cement has the following properties:
heat emission, J/g:
during the first day of hydration: 115
during the first three days of hydration: 165
ultimate compression strength, $kgf/cm^2$: 420
corrosion of steel reinforcement in concrete samples produced from this cement: none.

EXAMPLE 3

A raw mixture is produced having the following composition, percent by weight:
chalk (calculated for CaO): 35.3
quartz sand (calculated for $SiO_2$): 13.0
china clay (calculated for $Al_2O_3$): 11
pyrite cinders (calculated for $Fe_2O_3$): 0.9
commercial calcium chloride (calculated for $CaCl_2$): 12
periclase (MgO): 4
losses at calcination: 23.8.

These components are subjected to wet grinding; in doing so, calcium chloride is fed to the grinding stage in the form of a 20% aqueous solution. The ground product is fed into a rotary furnace, wherein the raw mixture is subjected to calcination at the temperature of 1,050° C. for 70 minutes. The resulting cement clinker is discharged from the furnace and subjected to grinding. Specific power consumption for grinding of the cement clinker to a residue of 12% on a sieve with a hole diameter of 80 mcm is 11.7 kwt.hr/ton.

The final cement has the following composition, percent by weight:
highly-basic calcium chlorosilicate: 50
calcium chloro-orthosilicate: 18
calcium chloroaluminate: 30
calcium chloroalumoferrite: 2.

The thus-produced cement has the following characteristics:
heat emission, J/g:
during the first day of hydration: 140
during the first three days of hydration: 190
ultimate compression strength, kgf/cm$^2$: 460
corrosion of steel reinforcement of concrete samples produced from this cement: none.

EXAMPLE 4

A raw mixture is prepared consisting of the following components, percent by weight:

| | |
|---|---|
| magnesial limestone (calculated for CaO) | 37.4 |
| (calculated for MgO) | 3 |
| loess loam, calculated for: | |
| SiO$_2$ | 15.3 |
| Al$_2$O$_3$ | |
| 3.9 | |
| Fe$_2$O$_3$ | 3.3 |
| commercial calcium chloride (calculated for CaCl$_2$) | 10 |
| losses at calcination | 27.1 |

Grinding of the above-indicated components, granulation of the raw mixture and grinding of the cement clinker are performed just as in the foregoing Example 1. Calcination of the raw mixture is conducted at the temperature of 1,100° C. Specific power consumption for grinding of the cement clinker to the residue of 12% on a sieve with a hole diameter of 80 mcm is 12 kW.hr/ton; for a residue of 4.5% it is 36 kW.hr/ton.

The thus-produced cement has the following composition, percent by weight:
highly-basic calcium chlorosilicate: 65
calcium chloro-orthosilicate: 19
calcium chloroaluminate: 4
calcium chloroalumoferrite: 12.

The cement has the following properties:
heat emission, J/g:
during the first day of hydration: 138.
during the first three days of hydration: 196.
ultimate compression strength, kgf/cm$^2$: 512.
corrosion of steel reinforcement in samples of concrete produced from this cement: none.

The following is a comparative Example 5 illustrating the production of cement from a known raw mixture by the prior art process, and the final cement properties.

EXAMPLE 5

A raw mixture is prepared having the following composition, percent by weight:
limestone (calculated for CaO): 38.3
quartz sand (calculated for SiO$_2$): 11.1
commercial alumina (calculated for Al$_2$O$_3$): 11.8
pyrite cinders (calculated for Fe$_2$O$_3$): 2.5
commercial calcium chloride (calculated for CaCl$_2$): 4.5
losses at calcination: 31.8.

Grinding of these components, granulation of the raw mixture and grinding of the cement clinker are effected in a manner similar to that described in Example 1 hereinbefore. Calcination of the raw mixture is conducted at the temperature of 1,350° C. Specific power consumption for grinding of the cement clinker to a residue of 11.5% on a sieve with the hole diameter of 80 mcm is 34.2 kW.hr/ton; that for a residue of 5% is equal to 89.3 kW.hr/ton.

The resulting cement has a following composition, percent by weight:
highly-basic calcium silicate (alite): 45
calcium orthosilicate (belite): 10
calcium chloroaluminate: 30
calcium alumoferrite: 15.

The final cement has the following properties:
heat emission, J/g:
during the first day of hydration: 215
during the first three day of hydration: 246
ultimate compression strength, kgf/cm$^2$: 380
corrosion of steel reinforcement in samples of concrete made of this cement, percent by weight:
after 1 month: 1.5
after 12 months: 2.3.

What is claimed is:

1. Cement consisting of a highly-basic calcium chlorosilicate, calcium chloro-orthosilicate, calcium chloroaluminate and calcium chloroalumoferrite, the components being present in the following proportions, percent by weight:
highly-basic calcium chlorosilicate: 20 to 75
calcium chloro-orthosilicate: 10 to 55
calcium chloroaluminate: 0.5 to 30
calcium chloroalumoferrite: 2 to 20.

2. Cement according to claim 1, in which the heat emission J./g. during the first day of hydration is about 115 to 140.

3. Cement according to claim 1, in which the heat emission J./g. during the first three days of hydration is about 165 to 196.

4. Cement according to claim 1, which has an ultimate compression strength after 28 days of hardening in water at a temperature of about 20° C. of about 400 to 500 kgf./cm.$^2$ 5. Cement according to claim 1 in which said cement is prepared by calcination at a temperature of from 1000° to 2000° C.

* * * * *